United States Patent [19]
Ito et al.

[11] Patent Number: 5,570,277
[45] Date of Patent: Oct. 29, 1996

[54] SWITCHING POWER SUPPLY APPARATUS

[75] Inventors: Akihiko Ito; Yukio Gotoh, both of Kawasaki, Japan

[73] Assignee: Fujitsu Limited, Kawasaki, Japan

[21] Appl. No.: 253,137

[22] Filed: Jun. 2, 1994

[30] Foreign Application Priority Data

Aug. 30, 1993 [JP] Japan ................................. 5-214594

[51] Int. Cl.$^6$ ................................................. H02M 3/335
[52] U.S. Cl. ................................................. 363/19; 363/53
[58] Field of Search ................................ 363/19, 53, 56

[56] References Cited

U.S. PATENT DOCUMENTS

| | | | |
|---|---|---|---|
| 4,387,478 | 6/1983 | Koike | 363/19 |
| 4,731,721 | 3/1988 | Igashira | 363/19 |
| 4,958,268 | 9/1990 | Nagagata et al. | 363/16 |
| 5,101,334 | 3/1992 | Plagge et al. | 363/19 |
| 5,175,675 | 12/1992 | Uramoto | 363/19 |
| 5,412,555 | 5/1995 | Uramoto | 363/18 |

*Primary Examiner*—Peter S. Wong
*Assistant Examiner*—Shawn Riley
*Attorney, Agent, or Firm*—Staas & Halsey

[57] ABSTRACT

A switching power supply apparatus rectifies an AC power input in a rectifier circuit, switches a rectified output and rectifies and smoothes the same in a switching circuit, and a desired DC voltage is derived. A current limiting circuit limits a current supplied to a smoothing capacitor of the rectifier circuit. A voltage detecting circuit detects a rectified output of the rectifier circuit. A current limiting control circuit controls the current limiting circuit in response to a detected voltage. The current limiting control circuit activates the current limiting circuit in a first preset period in which the detected voltage is equal to or lower than a preset level. Further, the current limiting control circuit activates the current limiting circuit for a second preset period after the detected voltage is first changed from a level equal to or higher than the preset level to a level lower than the preset level and then returned to the level equal to or higher than the preset level.

19 Claims, 8 Drawing Sheets

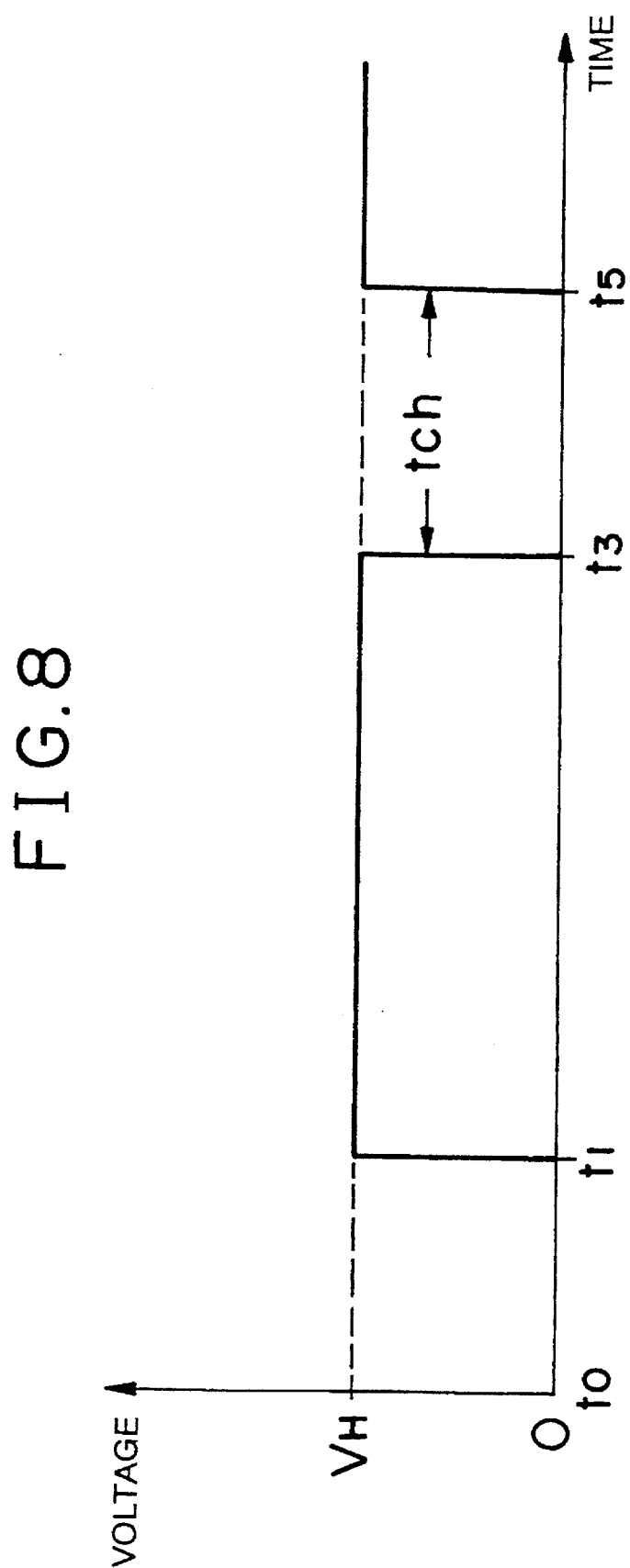

SWITCHING POWER SUPPLY APPARATUS

BACKGROUND OF THE INVENTION

1. Field of the Invention

The present invention relates to a switching power supply apparatus for deriving a DC power output of desired voltage by use of a switching regulator constructed as a DC-DC converter which converts a DC power obtained by rectifying an AC power input, and more particularly to a switching power supply apparatus designed to have a function of protection from an overcurrent flowing at the time of starting of the AC power input or overcurrent flowing at the time of recovery from temporary outage of the AC power input.

2. Description of the Related Art

In a switching power supply apparatus, an AC power input is converted into a DC power by a rectifier circuit, the thus obtained DC power is switched, rectified and smoothed by a switching regulator and then supplied to a load as a desired DC power output. The switching regulator is constructed as a DC-DC converter to convert a stabilized DC input into a DC output of desired voltage.

A power failure or outage may occur in the commercial power source, that is, in the AC power source provided by the electric company by various causes. Further, the AC power source may be sometimes subject to the instantaneous power failure or temporary outage which is a phenomenon that the power supply is temporarily interrupted only for a brief period of time. In various types of electric, electronic or electromechanical devices which require high reliability, it is necessary to suppress the influence by the power failure or temporary outage.

Among the conventional switching power supply apparatus, an apparatus as shown in FIG. 1 is provided. The switching power supply apparatus of FIG. 1 includes an AC power source 2, switching circuit 4, diodes D1, D2, capacitors C1, C2, resistor R1, transformer TF and thyristor TH.

An AC power input from the AC power source 2 is supplied to a rectifier circuit constructed by a series circuit of the diode D1, resistor R1 and capacitor C1 and a DC output is derived between two ends of the capacitor C1. The DC output between two ends of the capacitor C1 is switched by the switching circuit 4 and supplied to the primary side of the transformer TF as an AC power. When the gate of the thyristor TH is supplied with a signal derived from the primary side of the transformer TF and the thyristor is turned ON by the gate signal, it short-circuits the resistor R1. An output of the secondary side of the transformer TF is rectified and smoothed by a rectifier circuit constructed by the diode D2 and capacitor C2 and a DC power of desired voltage is derived between two ends of the capacitor C2.

In the switching power supply apparatus of FIG. 1, in order to prevent the breakage thereof even if the period of the temporary outage is relatively long, a capacitor of large capacitance is often used as the smoothing capacitor C1 of the rectifier for the AC power input. When input of an AC power from the AC power source 2 is interrupted by the temporary outage, charges stored on the smoothing capacitor C1 are discharged. As a result, since the DC voltage applied to the switching circuit 4 is kept at a value within substantially a range in which the normal operation can be effected within a short period of time, the switching circuit 4 is normally operated within a short period of time. If the AC power source 2 is recovered and a power input is supplied again within the short period of time, the DC power output between the two ends of the capacitor C2 on the secondary side of the transformer TF is not influenced by the temporary outage.

However, if the large capacitance capacitor is used as the smoothing capacitor C1 as described above, there occurs a possibility that an excessively large charging current (that is, rush current) temporarily flows into the smoothing capacitor C1 when the smoothing capacitor C1 is not sufficiently charged, for example, when the AC power source 2 is turned ON (when the power source is normally turned ON) while the temporary outage is not occurring. In order to prevent such an overcurrent, the resistor R1 is inserted between the AC power source 2 and the smoothing capacitor C1 as shown in FIG. 1 to suppress a current flowing when the AC power source 2 is turned ON. Then, it is determined that the smoothing capacitor C1 is sufficiently charged after the operation of the switching circuit 4 is continued for a short period of time and the thyristor TH which is a switching element for short-circuiting the resistor R1 is turned ON. When the thyristor TH is turned ON, the power input from the AC power source 2 is supplied to the smoothing capacitor C1 via the thyristor TH without passing the resistor R1. Therefore, in the steady state, unwanted power consumption in the current limiting resistor R1 can be prevented.

As described above, a temporary overcurrent flowing when the power source is turned ON can be limited even if the smoothing capacitor C1 is formed with large capacitance.

However, in the above switching power supply apparatus, an excessively large charging current at the time of turn-ON of the power source can be prevented, but an excessively large charging current at the time of recovery from the temporary outage cannot be prevented.

That is, since the smoothing capacitor C1 is discharged during the temporary outage, most of the charges stored on the smoothing capacitor C1 will be discharged unless the period of the temporary outage is extremely short. Therefore, when the AC power source 2 is recovered so as to supply the AC power again after occurrence of the temporary outage, an excessively large charging current flows into the smoothing capacitor C1. However, in this case, since the resistor R1 is already short-circuited by the thyristor TH, the overcurrent cannot be suppressed.

Therefore, in the conventional art, the smoothing capacitor C1 cannot be formed with excessively large capacitance, and as a result, the switching power supply apparatus can cope with only the temporary outage of short period of time.

SUMMARY OF THE INVENTION

An object of the present invention is to provide a switching power supply apparatus capable of effectively suppressing occurrence of the overcurrent at the time of recovery of the AC power source in the case of temporary outage even when the smoothing capacitor is formed with large capacitance and it is designed to cope with the temporary outage of relatively long period of time.

In a switching power supply apparatus of the present invention, a switching regulator circuit constructed as a DC-DC converter, for example, is used to switch, rectify and smooth a DC power obtained by rectifying an AC power input from the AC power source by a rectifier circuit and a desired DC power output is supplied to the load. The switching power supply apparatus includes a current limiting section, voltage detecting section and current limiting control section.

The current limiting section limits a current supplied from the AC power source to the rectifier circuit. The voltage detecting circuit directly or indirectly detects the DC voltage obtained in the rectifier circuit. The current limiting control section permits the operation of the current limiting section only in a period of time in which the DC voltage detected by the voltage detecting circuit is equal to or lower than a preset voltage level and in a period of time after the DC voltage detected by the voltage detecting circuit has been returned to a level equal to or higher than the preset voltage level in a case where the DC voltage is changed from a voltage level equal to or higher than the preset voltage to a voltage level lower than the preset voltage and recovered to the voltage level equal to or higher than the preset voltage.

Further, the current limiting section may include a current limiting element and a short-circuiting circuit, for example. The current limiting element limits a current supplied from the AC power source to the rectifier circuit. The short-circuiting circuit short-circuits the current limiting element.

The current limiting control section interrupts the operation of the short-circuiting circuit so as to cause the current limiting element to be effectively operated when a detected DC voltage is lower than a predetermined voltage level. The current limiting control section activates the short-circuiting circuit to interrupt the operation of the current limiting element when the DC voltage is equal to or higher than the predetermined voltage level. Further, the current limiting control section interrupts the operation of the short-circuiting circuit so as to cause the current limiting element to be effectively operated only for a preset period of time after a DC voltage has been returned to a level equal to or higher than the preset voltage level in a case where the DC voltage equal to or higher than the preset voltage level is first changed to a voltage level lower than the preset voltage level and then returned to a level equal to or higher than the preset voltage level. The current limiting control section interrupts the operation of the current limiting element by activating the short-circuiting circuit when a preset period of time has elapsed after the DC voltage is returned to a level equal to or higher than the preset voltage level.

The current limiting control section may include a level setting circuit and a comparison circuit. The level setting circuit previously sets a preset voltage level. The comparison circuit compares a DC voltage with the preset voltage level set by the level setting circuit.

The voltage detecting circuit may include a voltage dividing circuit having two or more resistors, for example, for dividing the DC voltage rectified by the rectifier circuit. The comparison circuit may include a comparator for comparing the divided DC voltage with the set level of the level setting circuit, and a feedback capacitor connected between the input terminal and the output terminal of the comparator. For example, the preset period of time is determined by the time constant of the feedback capacitor and the resistor of the voltage dividing circuit.

The rectifier circuit may include a diode for rectifying an AC current and a smoothing capacitor connected to the diode.

The switching regulator circuit may include a switching circuit, transformer and rectifier circuit. The switching circuit switches an input. The rectifier circuit rectifies and smoothes a current switched by the switching circuit and supplied via the transformer so as to derive a DC output.

In the switching power supply apparatus of the present invention, the rectifier circuit rectifies an AC voltage into a DC voltage when the AC power source is turned ON. The voltage detecting circuit directly detects the DC voltage or indirectly detects the DC voltage by voltage division. When the detected DC voltage is lower than a preset voltage level, the current limiting control section activates the current limiting section. Then, a current supplied from the AC power source to the rectifier circuit is limited by the current limiting section. Therefore, an overcurrent which may occur at the time of turn-ON can be prevented.

Further, in the switching power supply apparatus, when an AC input from the AC power source is temporarily interrupted and then immediately recovered, a DC voltage equal to or higher than the preset voltage level is lowered to a level lower than the preset voltage level and is then returned to a level equal to or higher than the preset voltage level after a short period of time. At this time, charges stored on the smoothing capacitor of the rectifier circuit are discharged while the DC voltage is lower than the preset voltage level so that the DC voltage applied to the switching circuit can be maintained and will be prevented from being lowered. As a result, most of the charges on the smoothing capacitor of the rectifier circuit will disappear.

When the DC voltage is returned to a level equal to or higher than the preset voltage level, an overcurrent tends to flow from the AC power source to the rectifier circuit, but the current limiting control section activates the current limiting section for a preset period of time after the DC voltage is set to a level equal to or higher than the preset voltage level. AS a result, a current supplied from the AC power source to the rectifier circuit is limited by the current limiting section. Therefore, occurrence of overcurrent can be prevented when the temporary outage occurs and then the DC voltage is recovered.

Thus, occurrence of overcurrent can be prevented at the time of turn-ON of the power source and occurrence of overcurrent can be prevented at the time of recovery from the temporary outage.

BRIEF DESCRIPTION OF THE DRAWINGS

Other objects and advantages of the invention will become apparent during the following discussion in conjunction with the accompanying drawings, in which:

FIG. 8 is an output voltage waveform showing the waveform of an output voltage of a comparator for illustrating the operation of the switching power supply apparatus of FIG. 6.

DETAILED DESCRIPTION OF THE PREFERRED EMBODIMENTS

[Embodiment 1]

Figure 1:
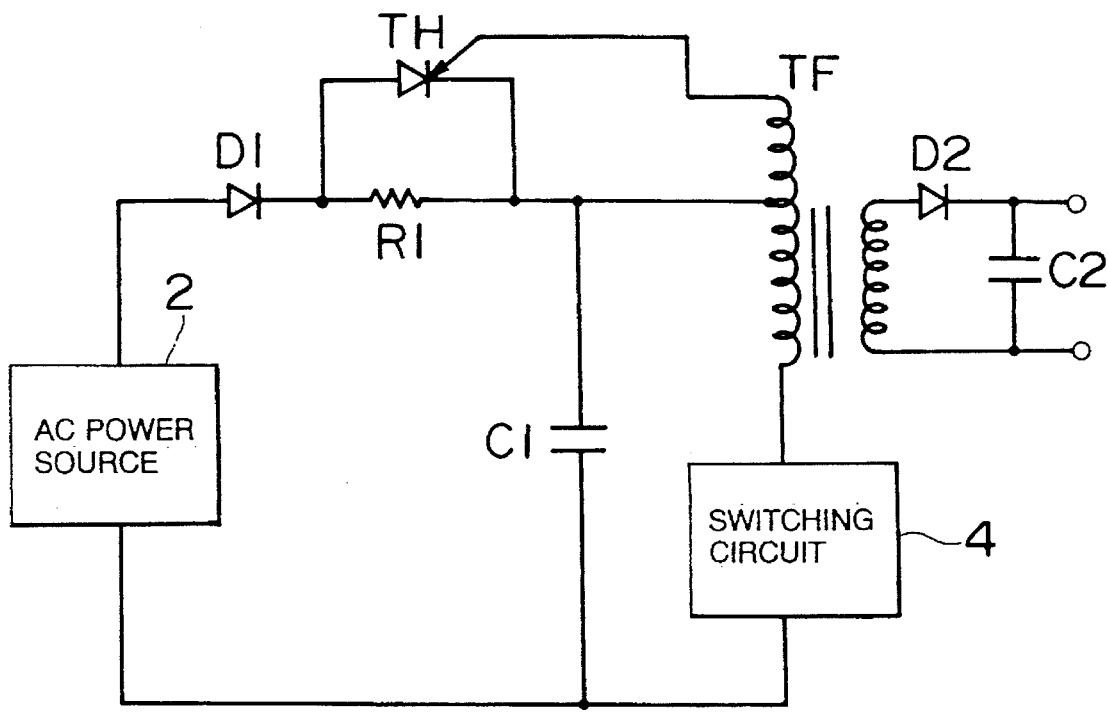
FIG. 1 is a circuit construction diagram showing a general construction of a switching power supply apparatus.
Figure 2:
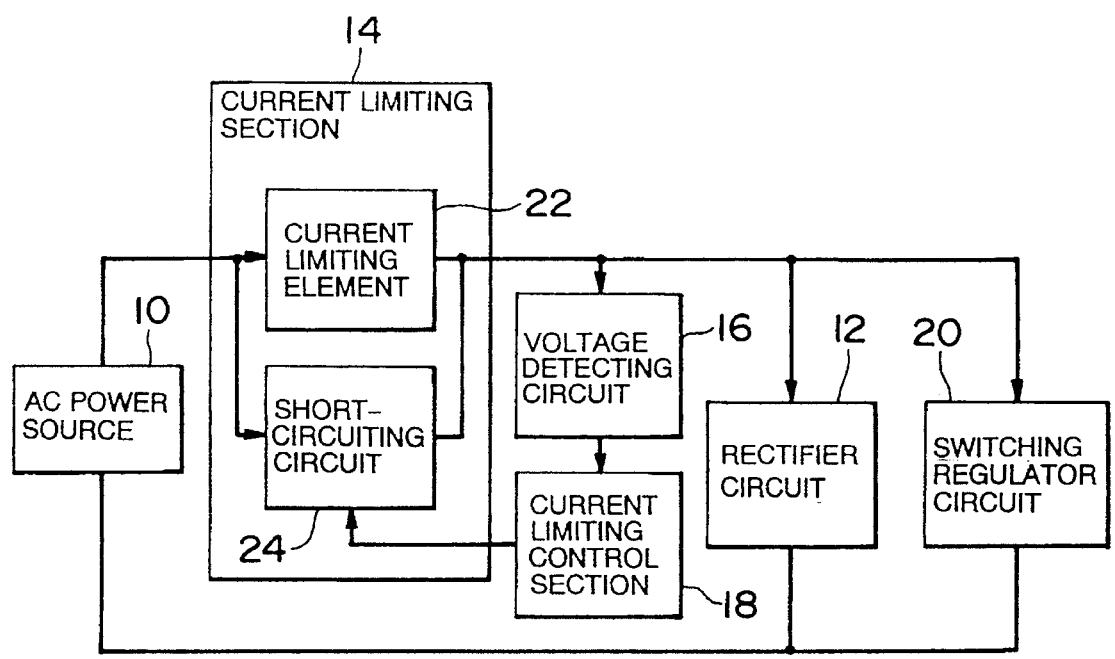
FIG. 2 is a block diagram showing the construction of a switching power supply apparatus according to a first embodiment of the present invention.

FIG. 2 shows the construction of a principle switching power supply apparatus according to a first embodiment of the present invention.

The switching power supply apparatus shown in FIG. 2 includes an AC power source 10, rectifier circuit 12, current limiting section 14, voltage detecting circuit 16, current limiting control section 18 and switching regulator circuit 20. In the switching power supply apparatus, an AC power input from the AC power source 10 is rectified by the rectifier circuit 12, switched, rectified and smoothed by the switching regulator circuit 20, and supplied to a load as a desired DC power output.

The AC power source 10 is a power source of the switching power supply apparatus itself and receives an AC power from the receptacle of the commercial power source and supplies the AC power output to the rectifier circuit 12, for example. The rectifier circuit 12 rectifies and smoothes an input from the AC power source 10 to derive a DC output and supplies the DC output to the switching regulator circuit 20.

The switching regulator circuit 20 is constructed as a DC-DC converter, switches, rectifies and smoothes a DC output from the rectifier circuit 12 to derive a stabilized DC power output of desired voltage. The DC power output is supplied to the load from the switching regulator circuit 20. The voltage detecting circuit 16 directly or indirectly detects the DC voltage derived in the rectifier circuit 12.

The current limiting control section 18 permits the operation of the current limiting section 14 only in a first preset period of time in which the DC voltage detected by the voltage detecting circuit 16 is equal to or lower than a preset voltage level and in a second preset period of time after the DC voltage detected by the voltage detecting circuit 16 has been returned to a level equal to or higher than the preset voltage level in a case where the DC voltage is first changed from a voltage level equal to or higher than the preset voltage to a voltage level lower than the preset voltage and then recovered to the voltage level equal to or higher than the preset voltage.

The operation of the current limiting section 14 is controlled by the current limiting control section 18 and the current limiting section 14 limits a current of AC input supplied from the AC power source 10 to the rectifier circuit 12 in the first and second periods of time. The current limiting section 14 includes a current limiting element 22 and a short-circuiting circuit 24, for example.

The current limiting element 22 is formed of a resistor, for example, and limits a current supplied from the AC power source 10 to the rectifier circuit 12. The short-circuiting circuit 24 is controlled by the current limiting control section 18 to short-circuit the current limiting element 22 so as to inhibit the operation of the current limiting element 22.

That is, the current limiting control section 18 interrupts the operation of the short-circuiting circuit 24 so as to make the current limiting function of the current limiting element 22 operative when a DC voltage detected by the voltage detecting circuit 16 is lower than a predetermined voltage level (first preset period of time). In this case, the current limiting control section 18 activates the short-circuiting circuit 24 to make the operation of the current limiting element 22 inoperative when the DC voltage becomes equal to or higher than the predetermined voltage level. Further, the current limiting control section 18 interrupts the operation of the short-circuiting circuit 24 so as to make the operation of the current limiting element 22 operative only for the second preset period of time after a DC voltage has been returned to a level equal to or higher than the preset voltage level in a case where the DC voltage equal to or higher than the preset voltage level is first changed to a voltage level lower than the preset voltage level and then returned to a level equal to or higher than the preset voltage level. Further, the current limiting control section 18 interrupts the operation of the current limiting element 22 by activating the short-circuiting circuit 24 when the second preset period of time has elapsed after the DC voltage was returned to a level equal to or higher than the preset voltage level.

In the switching power supply apparatus of FIG. 2, an AC power input is converted into a DC output by the rectifier circuit 12 when the AC power source 10 is turned ON. The voltage detecting circuit 16 directly or indirectly detects a voltage of the DC output. When the detected DC voltage is lower than a preset voltage level, the current limiting control section 18 activates the current limiting section 14. By the operation of the current limiting section 14, a current supplied from the AC power source 10 to the rectifier circuit 12 is limited by the current limiting section 14. Therefore, an overcurrent can be prevented in the first preset period of time in which the DC voltage is set at a level equal to or lower than a preset voltage level at the time of turn-ON of the power source.

Further, when a so-called temporary outage occurs, that is, when an AC input from the AC power source 10 is temporarily interrupted and then immediately recovered after a short period of time, a terminal voltage of the rectifier circuit 12, that is, a DC voltage supplied from the rectifier circuit 12 to the switching regulator circuit 20 is changed from a level equal to or higher than the preset voltage level to a level lower than the preset voltage level and is then returned to the level equal to or higher than the preset voltage level after a short period of time. At this time, charges stored on the rectifier circuit 12 (for example, the smoothing capacitor thereof) are discharged while the DC voltage is kept equal to or lower than the preset voltage level so that the DC voltage applied to the switching regulator circuit 20 can be maintained within a preset range for a certain period of time. As a result, most of the charges on (the smoothing capacitor of) the rectifier circuit 12 will disappear. Then, an overcurrent tends to flow from the AC power source 10 to the rectifier circuit 12 for charging (the capacitor) when the AC power input is recovered.

At this time, the current limiting control section 18 activates the current limiting section 14 for the second preset period of time after the DC voltage is returned to the initial normal level. While the current limiting section 14 is operated, a current supplied from the AC power source 10 to the rectifier circuit 12 is limited by the current limiting element 22. Therefore, occurrence of overcurrent in the second preset period of time can be prevented when the temporary outage occurs and then the DC voltage is returned to the normal level.

As described above, in the switching power supply apparatus of FIG. 2, the current limiting control section 18 activates the current limiting section 14 in the first period of time in which a DC voltage detected by the voltage detecting circuit 16 is set equal to or lower than a preset voltage level. Further, in a case where the DC voltage is changed from a level equal to or higher than a preset voltage level to a level lower than the preset voltage level and returned to the level equal to or higher than the preset voltage level, the current limiting control section 18 activates the current limiting section 14 only for the second period of time after the DC voltage has become lower than the preset voltage level. During the operation of the current limiting section 14, a current supplied from the AC power source 10 to the rectifier circuit 12 is limited.

Therefore, in the above switching power supply apparatus, an overcurrent in the first preset period of time at the time of turn-ON of the power source can be prevented and an overcurrent in the second preset period of time after recovery from the temporary outage can also be prevented. In the above switching power supply apparatus, since an overcurrent can be effectively and stably prevented, it can be adequately operated even if the amount of charges stored on the rectifier circuit 12 is increased.

[Embodiment 2]

Figure 3:
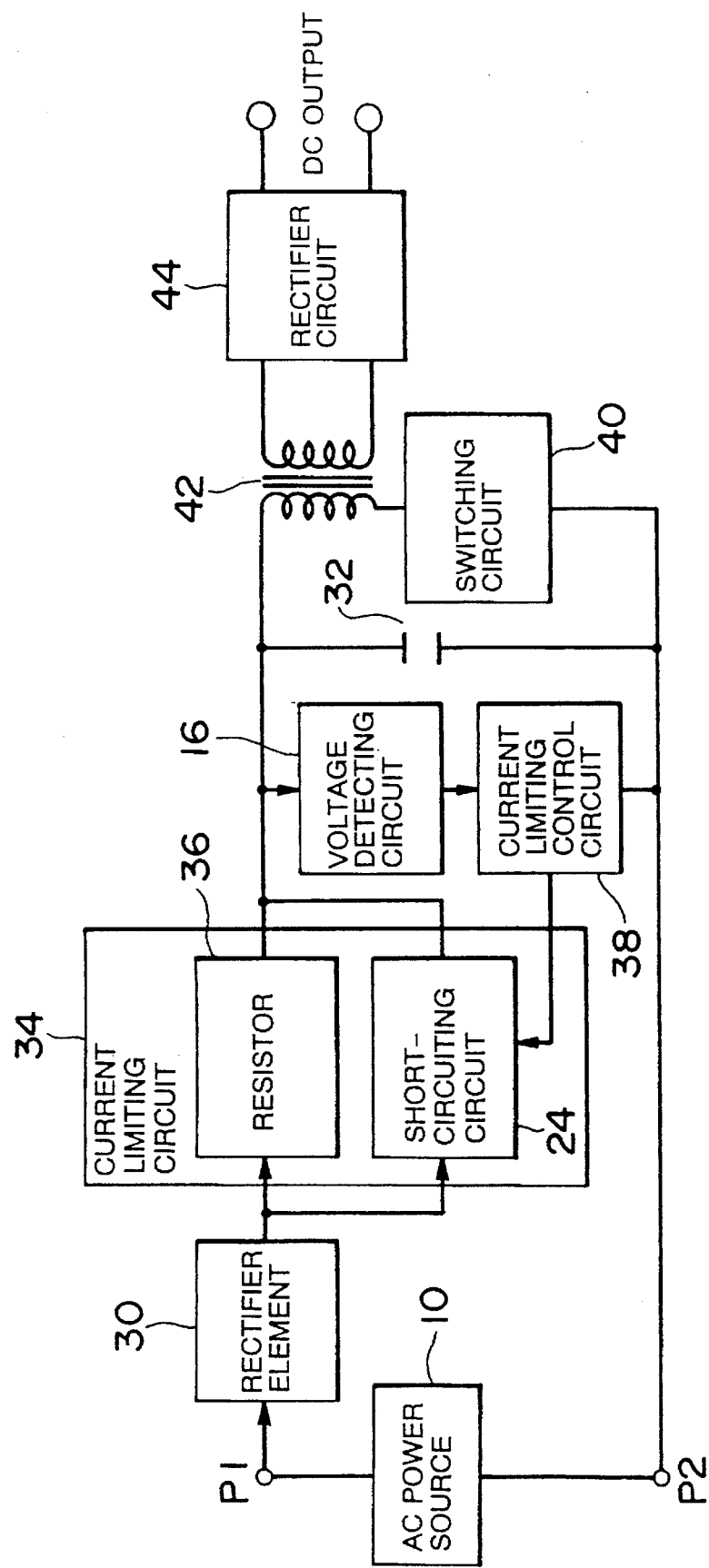
FIG. 3 is a block diagram showing the construction of a switching power supply apparatus according to a second embodiment of the present invention.

FIG. 3 shows the detail construction of a switching power supply apparatus according to a second embodiment of the present invention. In FIG. 3, portions which are the same as those of FIG. 2 are denoted by the same reference numerals and the explanation thereof is omitted.

The switching power supply apparatus shown in FIG. 3 comprises a rectifier element 30, smoothing capacitor 32, current limiting circuit 34, current limiting control circuit 38, switching circuit 40, transformer 42 and rectifier circuit 44. Further, the switching power supply apparatus of FIG. 3 includes an AC power source 10, voltage detecting circuit 16 and short-circuiting circuit 24 which are the same as those of FIG. 2, and has a resistor 36.

The AC power source 10 supplies an AC power input to terminals P1 and P2. When the temporary outage occurs, the instantaneous value of the AC power input is temporarily lowered. That is, the instantaneous value is set to zero by occurrence of the temporary outage for a period of half cycle of a continuous AC signal, for example, or for a longer period of time. Further, the instantaneous value of the AC power is returned to a normal value when a short period of time has elapsed after occurrence of the temporary outage. The root mean square value of the voltage of the AC power source 10 is 100 V, for example.

The rectifier element 30 is connected to the AC power source 10 via the terminal P1, for example. The rectifier element 30 is combined with a smoothing capacitor 32 to construct a rectifier circuit which is substantially the same as the rectifier circuit 12 of FIG. 2. The rectifier element 30 is constructed by a diode, for example, and rectifies and converts an AC input into a DC output.

The current limiting circuit 34 is connected between the rectifier element 30 and the smoothing capacitor 32. The current limiting circuit 34 is constructed by the short-circuiting circuit 24 and the resistor 36. The resistor 36 is connected between the rectifier element 30 and the smoothing capacitor 32. The resistor 36 functions as a current limiting element to limit a current so as to prevent an overcurrent from flowing into the smoothing capacitor 32.

The short-circuiting circuit 24 is connected such that the shorting path thereof will be connected in parallel with the resistor 36. The short-circuiting circuit 24 short-circuits the resistor 36 in response to a control signal supplied from the current limiting control circuit 38. The short-circuiting circuit 24 is constructed by use of a transistor, FET (field effect transistor) or relay, for example.

The smoothing capacitor 32 stores charges according to a current supplied from the AC power source 10 via the rectifier circuit 30 and current limiting circuit 34 and removes the ripple component thereof to derive a smooth DC voltage. The voltage detecting circuit 16 is connected to a connection node between the resistor 36 and the smoothing capacitor 32. The voltage detecting circuit 16 directly or indirectly detects a DC voltage derived by the smoothing capacitor 32 and current limiting circuit 34.

The current limiting control circuit 38 is connected to the voltage detecting circuit 16. The current limiting control circuit 38 supplies a control signal to the short-circuiting circuit 24 to control the short-circuiting circuit 24 according to a DC voltage detected by the voltage detecting circuit 16.

Figure 4:
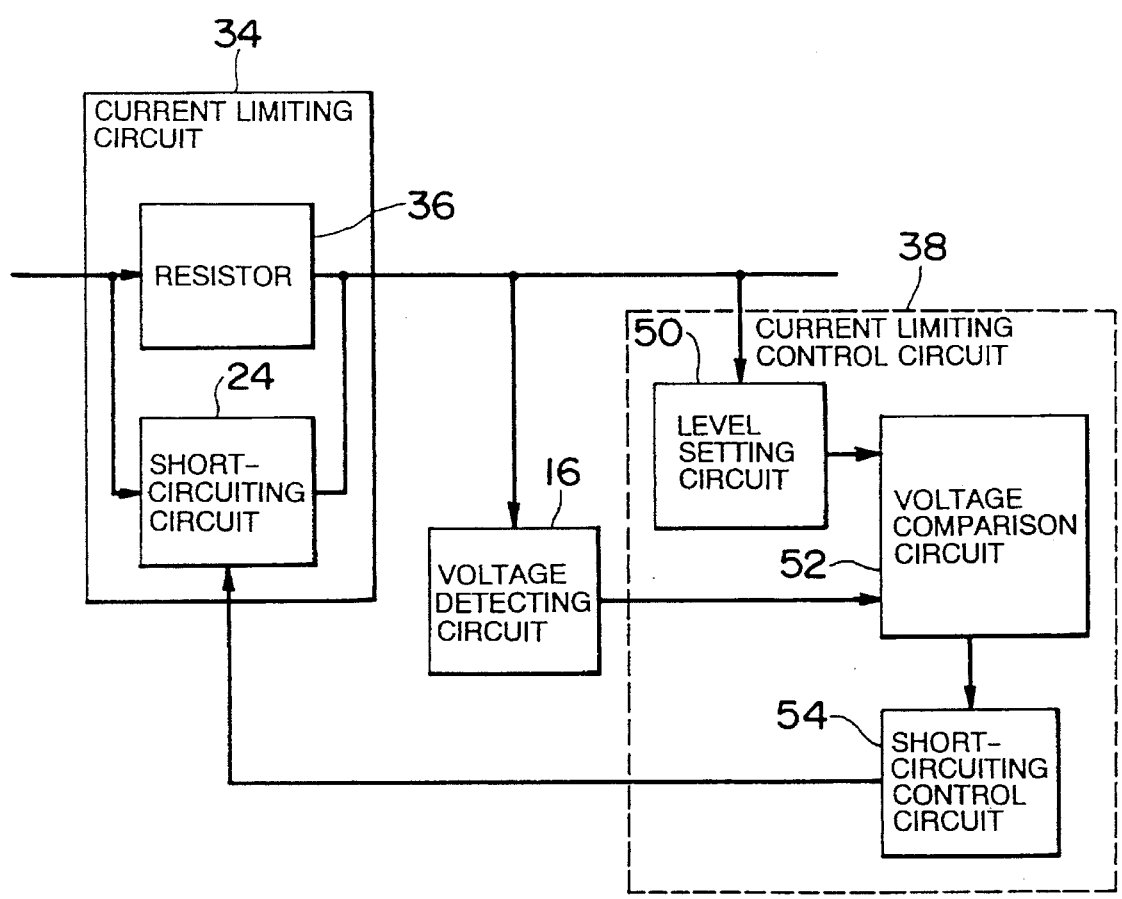
FIG. 4 is a block diagram showing part of the construction of the switching power supply apparatus of FIG. 3 in detail.

The detail construction of the current limiting control circuit 38 is shown in FIG. 4. The current limiting control circuit 38 of FIG. 4 includes a level setting circuit 50, voltage comparison circuit 52 and short-circuiting control circuit 54.

For example, like the voltage detecting circuit 16, the level setting circuit 50 is connected to a connection node between the resistor 36 and the smoothing capacitor 32. The level setting circuit 50 sets a preset level by use of a DC voltage derived from the smoothing capacitor 32. The set level by the level setting circuit 50 is determined when the DC voltage has reached the preset level and then holds the level for a certain period of time which is long enough to effect the control operation as will be described below. The voltage comparison circuit 52 is supplied with outputs of the level setting circuit 50 and a DC voltage detecting circuit 21. The voltage comparison circuit 52 compares a DC voltage detected by the voltage detecting circuit 16 with the preset level set by the level setting circuit 50.

The short-circuiting control circuit 54 is supplied with the result of comparison of the voltage comparison circuit 52. The short-circuiting control circuit 54 sets the short-circuiting circuit 24 into the inoperative state so as to make the resistor 36 effective when the detected DC voltage is lower than the preset level. The above period is a first preset period. The short-circuiting control circuit 54 activates the short-circuiting circuit 24 to make the resistor 36 ineffective when the DC voltage becomes equal to or higher than the preset level. Further, in a case where the DC voltage which is equal to or higher than the preset level is first changed to a level lower than the preset level and then recovered in a short period of time, the short-circuiting control circuit 54 sets the short-circuiting circuit 24 into the inoperative state to make the resistor 36 effective for a second preset period of time after the DC voltage is returned to the level equal to or higher than the preset level. The short-circuiting control circuit 54 activates the short-circuiting circuit 24 to short-circuit the resistor 36 after the second preset period of time has elapsed.

In the switching power supply apparatus of FIG. 3, the primary winding of the transformer 42 and the switching circuit 40 are serially connected between two ends of the smoothing capacitor 32. The switching circuit 40 switches a DC input appearing across the smoothing capacitor 32. The secondary winding of the transformer 42 is connected to the rectifier circuit 44. For example, the rectifier circuit 44 is constructed by a diode and a capacitor, and rectifies and smoothes an AC output induced in the secondary winding of the transformer 42 and then outputs the thus obtained output as a DC output. The DC output of the rectifier circuit 44 is supplied to a load (not shown).

Next, the operation of the switching power supply apparatus according to the second embodiment shown in FIGS. 3 and 4 is explained.

Figure 5:
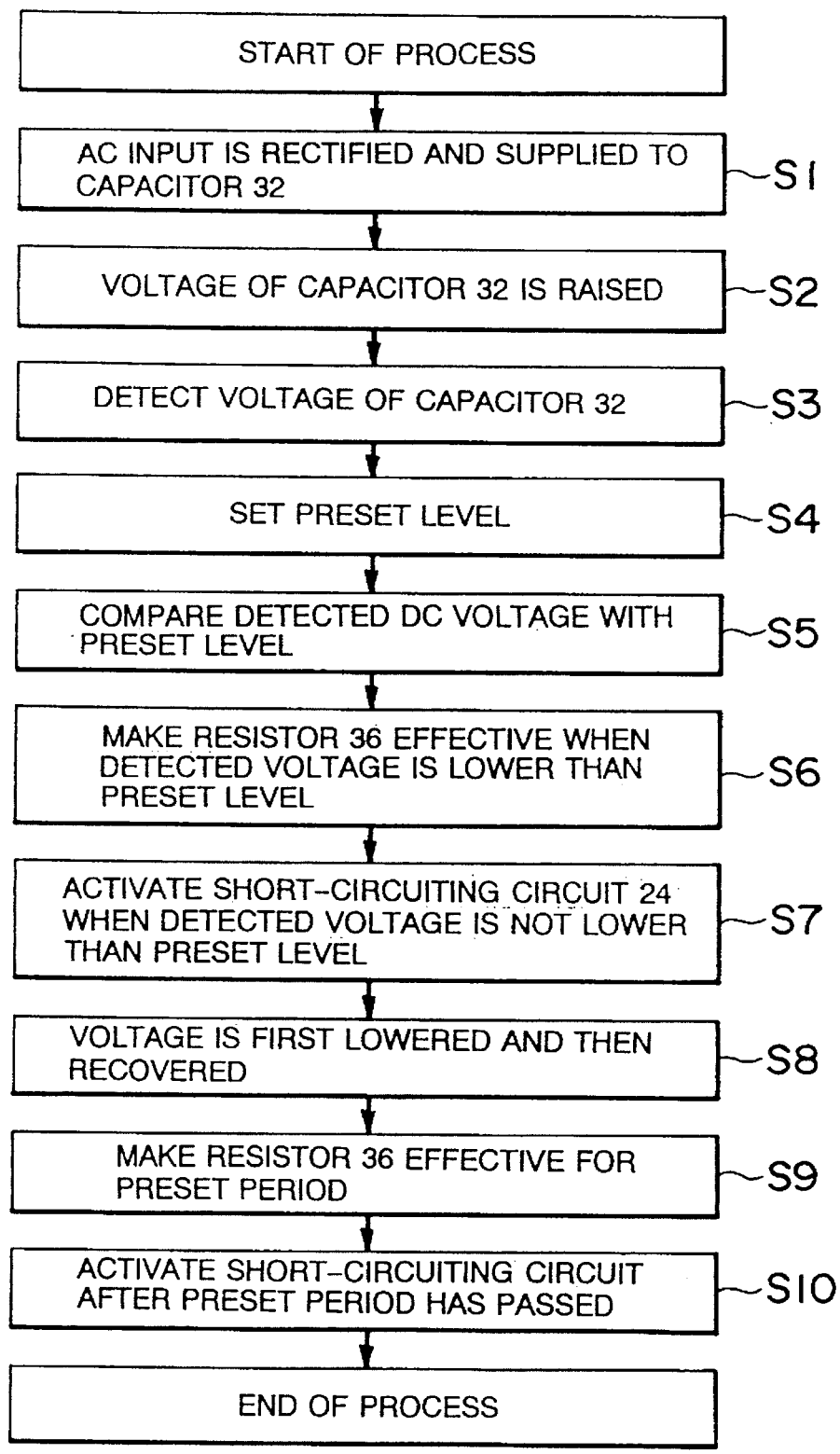
FIG. 5 is a flowchart for illustrating the operation of the switching power supply apparatus of FIG. 3.

FIG. 5 is a flowchart for illustrating the operation of the switching power supply apparatus shown in FIGS. 3 and 4.

When the AC power source 10 is turned ON, an AC power input is rectified by the rectifier element 30 and supplied to the smoothing capacitor via the current limiting circuit 34

(step S1). As a result, the voltage of the smoothing capacitor 32 gradually rises (step S2). The voltage detecting circuit 16 directly or indirectly detects a DC voltage appearing across the smoothing capacitor 32 (step S3). The level setting circuit 50 sets a preset level used for the control operation of the current limiting control circuit 38 by use of a DC voltage derived via the smoothing capacitor 32 (step S4).

The voltage comparison circuit 52 compares a DC voltage detected by the voltage detecting circuit 16 with the preset level set by the level setting circuit 50 (step S5).

The short-circuiting control circuit 54 sets the short-circuiting circuit 24 into the inoperative state to make the resistor 36 effective when the detected DC voltage is lower than the preset level (step S6). A current supplied from the AC power source 10 to the smoothing capacitor 32 is limited by the resistor 36. Therefore, occurrence of overcurrent in the first period at the time of turn-ON of the AC power source 10 can be prevented. The short-circuiting control circuit 54 activates the short-circuiting circuit 24 when the DC voltage exceeds the preset level (step S7). In this case, since the AC input is supplied to the smoothing capacitor 32 without passing the resistor 36, unwanted power consumption in the resistor 36 can be prevented.

Assume now that the AC input from the AC power source 10 is interrupted and then recovered after a short period of time. In this case, a DC voltage which is equal to or higher than the preset level is first lowered to a level lower than the preset level and then returned to a level equal to or higher than the preset level after a short period of time (step S8). While the DC voltage is kept lower than the preset level, charges stored on the smoothing capacitor 32 are discharged so that the DC voltage applied to the switching circuit 40 can be maintained within a preset operation range. As a result, most of the stored charges on the smoothing capacitor 32 will disappear. Therefore, an excessively large current tends to flow from the AC power source 10 to the smoothing capacitor 32 when the DC voltage is returned to the level equal to or higher than the preset level.

At this time, the short-circuiting control circuit 54 makes the resistor 36 effective by delaying activation of the short-circuiting circuit 24 by the second preset period of time after the DC voltage has become equal to or higher than the preset level (step S9). While the resistor 36 is effective, a current supplied from the AC power source 10 to the smoothing capacitor 32 is limited by the resistor 36. Therefore, occurrence of overcurrent at the time of recovery after occurrence of temporary outage can be prevented. Further, the short-circuiting control circuit 54 activates the short-circuiting circuit 24 after the second period of time has elapsed (step S10).

[Embodiment 3]

Figure 6:
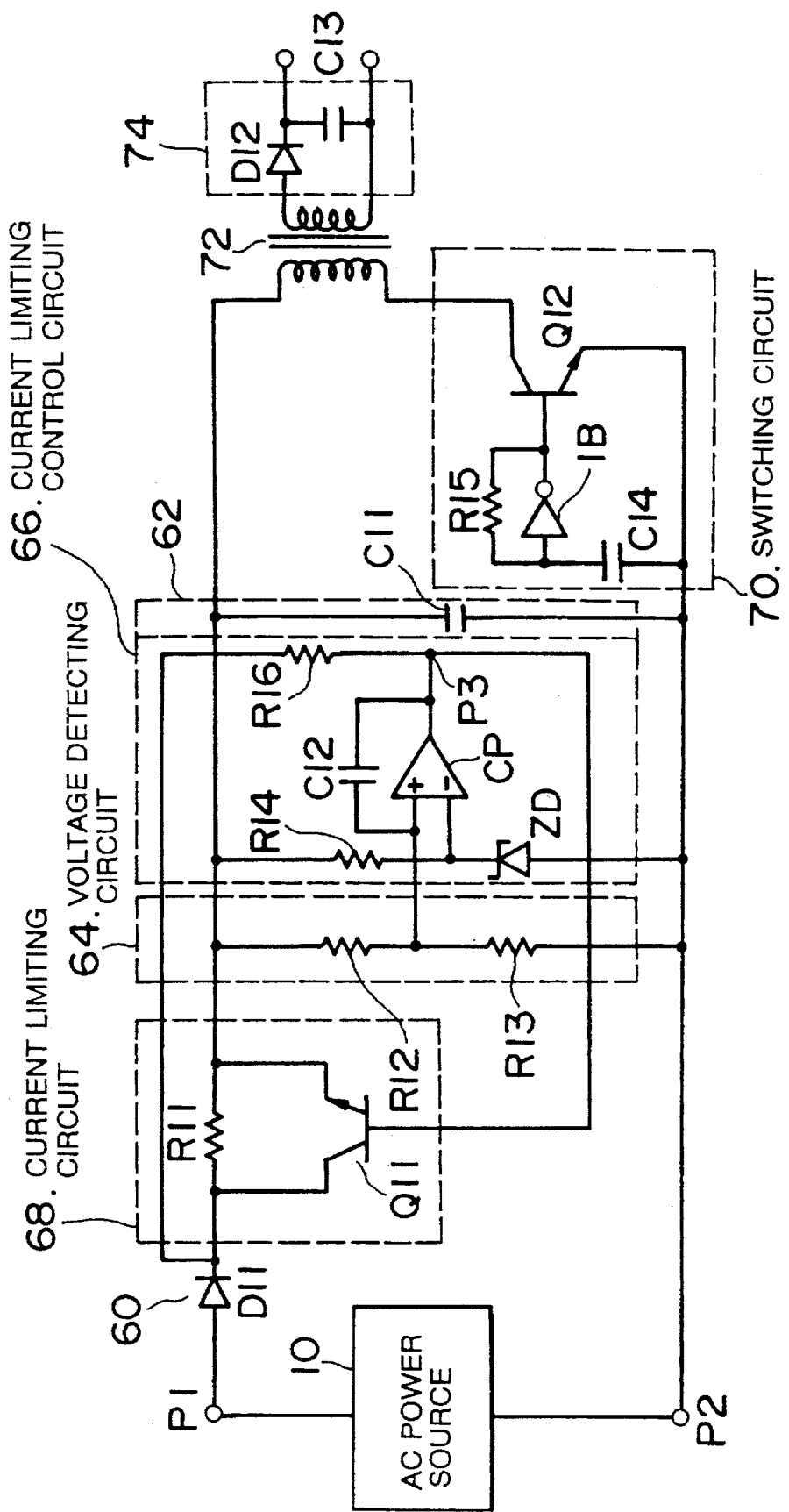
FIG. 6 is a circuit construction diagram showing the construction of a switching power supply apparatus according to a third embodiment of the present invention.

FIG. 6 shows the more concrete construction of a switching power supply apparatus according to a third embodiment of the present invention.

The switching power supply apparatus shown in FIG. 6 includes an AC power source 10, rectifier element 60, smoothing capacitor 62, voltage detecting circuit 64, current limiting control circuit 66, current limiting circuit 68, switching circuit 70, transformer 72 and rectifier circuit 74. The AC power source 10 is substantially the same as that shown in FIGS. 2 and 3. The rectifier element 60, smoothing capacitor 62, voltage detecting circuit 64, current limiting control circuit 66, current limiting circuit 68, switching circuit 70, transformer 72 and rectifier circuit 74 respectively correspond to the rectifier element 30, smoothing capacitor 32, voltage detecting circuit 16, current limiting control circuit 38, current limiting circuit 34, switching circuit 40, transformer 42 and rectifier circuit 44 shown in FIG. 3.

The rectifier element 60 is constructed by a diode D11 and the smoothing capacitor 62 is constructed by a capacitor C11. The voltage detecting circuit 64 is constructed by a series circuit of resistors R12 and R13. The current limiting control circuit 66 includes a voltage comparator CP, resistors R14, R16, capacitor C12 and Zener diode ZD. The current limiting circuit 68 includes a resistor R11 and transistor Q11. The switching circuit 70 includes a transistor Q12, inverting buffer IB, resistor R15 and capacitor C14. The rectifier circuit 74 includes a diode D12 and capacitor C13. The transformer 72 is substantially the same as the transformer 42 of FIG. 3.

One terminal P1 of the AC power source 10 is connected to the anode of the diode D11. The cathode of the diode D11 is connected to one end of the resistor R11 of the current limiting circuit 68. The resistor R11 limits a charging current flowing into the smoothing capacitor C11. Two ends of the resistor R11 are respectively connected to the collector and emitter of the transistor Q11. The transistor Q11 constitutes a short-circuiting circuit and short-circuits the resistor R11 in the ON state. The resistor R11 and transistor Q11 constitute the current limiting circuit 68.

The other end of the resistor R11 is connected to one terminal of the smoothing capacitor C11 and one end of the resistor R12 of the voltage detecting circuit 64. The smoothing capacitor C11 stores charges according to a charging current supplied via the diode D11 and the resistor R11 of the current limiting circuit 68.

The voltage detecting circuit 64 divides and detects the terminal voltage of the smoothing circuit C11 by use of the resistors R12 and R13 and supplies a detected voltage from a connection node between the resistors R12 and R13 to a non-inverting input terminal (+) of the comparator CP.

The other end of the resistor R11 is connected to one end of a series circuit of the resistor R14 and Zener diode ZD. The resistor R14 and Zener diode ZD constitute a level setting circuit. The level of a voltage on a connection node between the resistor R14 and the Zener diode ZD is kept at a constant level by the Zener diode ZD. The level setting circuit applies a voltage on the connection node between the resistor R14 and the Zener diode ZD to an inverting input terminal (−) of the comparator CP.

The feedback capacitor C12 is connected between the output terminal and non-inverting input terminal of the comparator CP. The resistor R16 is connected between the output terminal of the comparator CP and a connection node between the resistor R11 and the diode D11. The comparator CP, feedback capacitor C12 and resistor R16 constitute a short-circuiting control circuit.

The comparator CP is operated according to the relation between a voltage divided and detected by use of the resistors R12 and R13 and a voltage set by the Zener diode ZD. The resistances of the resistors R12, R13 and R14 and the Zener voltage of the Zener diode ZD are determined such that the detected voltage input to the non-inverting input terminal will become lower than the Zener voltage input to the inverting input terminal when an input DC voltage becomes lower than a preset voltage level $V_s$.

When the voltage input to the non-inverting input terminal is lower than the voltage input to the inverting input terminal, the output state of the comparator CP is set into the ON state (the output terminal thereof is set to a common potential, for example, ground potential). As a result, a voltage at the output terminal of the comparator CP is set to a low level "0". When the input voltage to the non-inverting input terminal is equal to or higher than the input voltage to the inverting input terminal, the output state of the comparator CP is set into the open state (the potential of the output terminal thereof is separated from the ground potential). As a result, a voltage at the output terminal of the comparator CP is pulled up by the resistor R16 and set to a high level "$V_H$". An output of the comparator CP is supplied to the base of the transistor Q11.

The other end of the resistor R11, that is, a connection node between the resistor R11 and the smoothing capacitor C11 is connected to one end of the primary winding of the transformer 72 and the other end of the primary winding of the transformer 72 is connected to the switching circuit 70.

The switching circuit 70 switches and converts a DC current obtained in the smoothing capacitor C11 into an AC current. The switching circuit 70 has a transistor Q12 as a switching element. The collector of the transistor Q12 is connected to the other end of the primary winding, the emitter of the transistor Q12 is connected to the other terminal P2 of the AC power source 10, and the base of the transistor Q12 is connected to one end of the resistor R15. The inverting buffer 41 is connected in parallel with the resistor R15. The other end of the resistor R15 or the input terminal of the inverting buffer 41 is connected to one end of the capacitor C14 and the other end of the capacitor C14 is connected to the emitter of the transistor Q12.

The transistor Q12 switches the terminal voltage of the smoothing capacitor C11 to create an AC voltage. In this case, the switching frequency (AC frequency of an input of the transformer 72) is an oscillation frequency based on the time constant determined by the capacitor C14 and resistor R15 and is substantially equal to $1/(C14 \cdot R15)$. The AC frequency is 100 kHz to 200 kHz, for example. The transformer 72 and smoothing capacitor C11 can be made small by setting the AC frequency to a relatively high frequency.

The transformer 72 has the primary and secondary windings, in this case, the number of turns of the primary winding is larger than that of the secondary winding so as to step down the primary voltage and output the stepped-down voltage to the secondary side. One end of the secondary winding of the transformer 72 is connected to the anode of the diode D12. The capacitor C13 is connected between the cathode of the diode D12 and the other end of the secondary winding. The diode D12 and capacitor C13 constitute the rectifier circuit 44 and a rectified DC output is derived from between the two ends of the capacitor C13.

Figure 7:
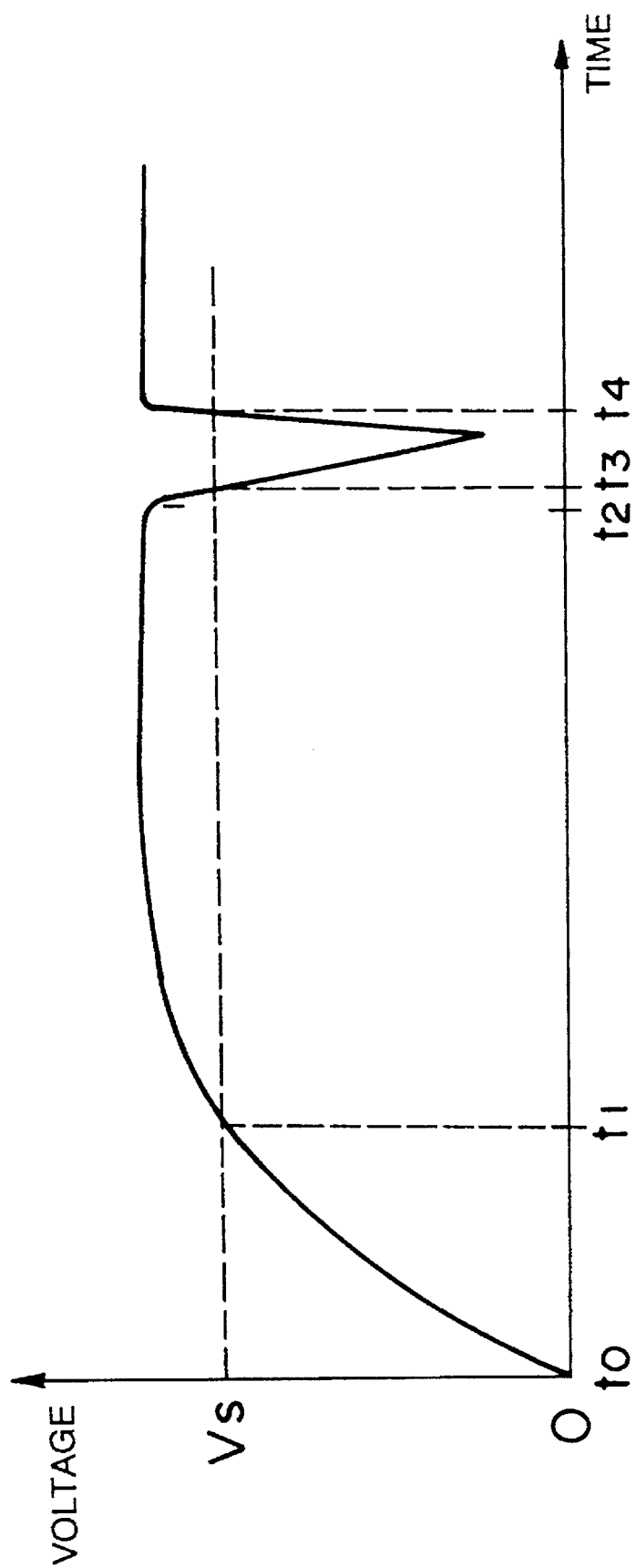
FIG. 7 is a voltage waveform diagram showing the waveform of a voltage on a smoothing capacitor, for illustrating the operation of the switching power supply apparatus of FIG. 6.

Next, the operation of the switching power supply apparatus of FIG. 6 is explained. FIG. 7 is a timing chart showing a DC voltage appearing across the smoothing capacitor C11, and FIG. 8 is a timing chart showing a control signal supplied to the base of the transistor Q11 of the current limiting circuit 68 as an output of the comparator CP.

First, if the AC power source 10 is turned ON at time t0, an AC power input is rectified by the diode D11 and a current is supplied to the smoothing capacitor C11 via the resistor R11 of the current limiting circuit 68 to charge the smoothing capacitor C11. As shown in FIG. 7, a charging voltage appearing across the smoothing capacitor C11 gradually rises.

The terminal voltage of the smoothing capacitor C11 is divided by the resistors R12 and R13 and a divided voltage is derived from the connection node between the resistors R12 and R13. The preset voltage level $V_s$ is determined by the Zener diode ZD.

The comparator CP compares a voltage on the non-inverting input terminal or a detected voltage on the connection node between the resistors R12 and R13 with a voltage on the inverting input terminal or the preset voltage level $V_s$ determined by the Zener diode ZD.

In a period from time t0 at which the AC power source 10 is turned ON to time t1, the detected voltage on the connection node between the resistors R12 and R13 is lower than the preset voltage level $V_s$ as shown in FIG. 7. In this period, the comparator CP is set in the ON state and the level of a control signal on a point P3 is set to "0" by a current flowing from the resistor R13 into the output terminal of the comparator CP as shown in FIG. 8.

In a period in which the control signal voltage "0" is supplied to the base of the transistor Q11, that is, in the first period of time, the transistor Q11 is set in the OFF state and a current is supplied from the AC power source 10 to the smoothing capacitor C11 via the resistor R11. Since the current supplied from the AC power source 10 to the smoothing capacitor C11 in the first period of time is limited by the resistor R11, occurrence of overcurrent immediately after the turn-ON of the AC power source 10 can be prevented.

Next, in a period from time t1 to time t3, the detected voltage becomes equal to or higher than the preset voltage level $V_s$ as shown in FIG. 7. In this condition, the comparator CP is set into the OFF state and since no current will flow into the output terminal of the comparator CP, the voltage of the control signal on the point P3 is pulled up and raised via the resistor R16 and set to the high level "$V_H$" as shown in FIG. 8.

When the control signal voltage "$V_H$" is applied to the base of the transistor Q11, the transistor Q11 is turned ON and the resistor R11 is short-circuited by the transistor Q11. As a result, a current is directly supplied from the AC power source 10 to the smoothing capacitor C11, thereby preventing unnecessary power consumption in the resistor R11.

Next, assume that the temporary outage occurs in the AC power source 10 at time t2 as shown in FIG. 7. In this case, the detected voltage becomes lower than the preset voltage level $V_s$ after time t3 and is returned to a level equal to or higher than the preset voltage level $V_s$ at time t4.

While the detected voltage is kept lower than the preset voltage level $V_s$, a voltage applied to the primary winding of the transformer 72 and the switching circuit 70 can be held in a preset range (in which a normal power output can be derived) by discharging charges stored on the smoothing capacitor C11. As a result, most of the charges on the smoothing capacitor C11 are discharged.

When the detected voltage is returned to a level equal to or higher than the preset voltage level $V_s$, an overcurrent tends to flow from the AC power source 10 into the smoothing capacitor C11 so as to charge the smoothing capacitor C11.

That is, the comparator CP sets the output circuit into the ON state after time t3 at which the detected voltage becomes lower than the preset voltage level $V_s$, a current flows into the output circuit of the comparator CP via the resistor R16, and the control signal voltage on the output point P3 of the comparator CP is set to "0" as shown in FIG. 8. As a result, a current also flows into the feedback capacitor C12 and a voltage on the non-inverting input terminal of the comparator CP is further lowered.

Even if the detected voltage is returned to a level equal to or higher than the preset voltage level $V_s$ at time t4 after it has been set lower than the preset voltage level $V_s$, the voltage on the non-inverting input terminal of the comparator CP is kept lower than the voltage on the inverting input terminal for a preset period of time $t_{ch}$ after time t4. As a result, the control signal voltage is set to "0". In this case, the second preset period $t_{ch}$ is determined by the time constant defined by values of the resistor R12 and capacitor C12 as indicated by the following equation.

$t_{ch}=1/(R12 \cdot C12)$

If the above control signal voltage is applied to the transistor Q11, the transistor Q11 is turned OFF and a current supplied from the AC power source 10 to the smoothing capacitor C11 is limited by the resistor R11. Therefore, occurrence of overcurrent can be prevented also at the time of recovery after occurrence of temporary outage.

At time t5 after elapse of the preset period of time $t_{ch}$, the detected voltage is already returned to the initial level. After time t5, the comparator CP applies the control signal voltage "$V_H$" to the transistor Q11 as shown in FIG. 8 to turn ON the transistor Q11. Therefore, after this, a current is supplied from the AC power source 10 to the smoothing capacitor C11 via the transistor Q11, thereby preventing unnecessary power consumption in the resistor R11.

It is apparent that, in this invention, a wide range of different working modes can be formed based on the invention without deviating from the spirit and scope of the invention.

What is claimed is:

1. A switching power supply apparatus comprising:

an AC power source for supplying an AC power input;

a rectifier circuit for rectifying the AC power input from said AC power source;

a switching regulator for switching and smoothing an output of said rectifier circuit and outputting a preset DC voltage;

a current limiting circuit for limiting a current supplied from said AC power source to said rectifier circuit;

a voltage detecting circuit for detecting a voltage rectified by said rectifier circuit; and a current limiting control circuit for comparing a detected voltage detected by said voltage detecting circuit with a preset level and setting said current limiting circuit into an operative state in a first period of time in which the detected voltage is lower than the preset level and in a second period of time after the detected voltage is returned to a level which is not lower than the preset level in a case where the detected voltage is first changed from a level which is not lower than the preset level to a level which is lower than the preset level and then returned to a level which is not lower than the preset level.

2. An apparatus according to claim 1, wherein said current limiting circuit includes a current limiting element for limiting a current supplied from said AC power source to said rectifier circuit; and a short-circuiting circuit for short-circuiting said current limiting element.

3. An apparatus according to claim 2, wherein said current limiting element includes a resistor.

4. An apparatus according to claim 2, wherein said current limiting control circuit includes a circuit for making said short-circuiting circuit inoperative to make said current limiting element operative in a case where the detected voltage is lower than the preset level and making said short-circuiting circuit operative to make said current limiting element inoperative in a case where the detected voltage is not lower than the preset level.

5. An apparatus according to claim 2, wherein said current limiting control circuit includes a circuit for making said short-circuiting circuit inoperative to make said current limiting element operative for the second period of time after the detected voltage is returned to a level not lower than the preset level in a case where the detected voltage is first changed from a level which is not lower than the preset level to a level lower than the preset level and returned to the level which is not lower than the preset level and making said short-circuiting circuit operative to make said current limiting element inoperative after the second preset period of time has elapsed.

6. An apparatus according to claim 1, wherein said current limiting control circuit includes a level setting circuit for setting the preset level; and a voltage comparison circuit for comparing the detected voltage with the preset level set by said level setting circuit.

7. An apparatus according to claim 6, wherein said voltage detecting circuit includes at least two resistors for dividing a voltage rectified by said rectifier circuit.

8. An apparatus according to claim 7, wherein said comparison circuit includes a comparator for comparing a detected voltage derived by voltage division with the preset level; and a feedback capacitor connected between an input terminal and output terminal of said comparator, for determining the time constant defining the second preset period together with part of said voltage dividing resistors.

9. An apparatus according to claim 1, wherein said rectifier circuit includes a diode and a smoothing capacitor.

10. A switching power supply apparatus comprising:

an AC power source for supplying an AC power input;

a first rectifier circuit for rectifying the AC power input from said AC power source;

a switching circuit for switching an output of said first rectifier circuit;

a transformer having a primary side supplied with a current switched by said switching circuit;

a second rectifier circuit for rectifying and smoothing a secondary side output of said transformer and outputting a preset DC voltage; a current limiting circuit for limiting a current supplied from said AC power source to said first rectifier circuit;

a voltage detecting circuit for detecting a voltage rectified by said first rectifier circuit; and a current limiting control circuit for comparing a detected voltage detected by said voltage detecting circuit with a preset level and setting said current limiting circuit into an operative state in a first period of time in which the detected voltage is lower than the preset level and in a second period of time after the detected voltage is returned to a level which is not lower than the preset level in a case where the detected voltage is first changed from a level which is not lower than the preset level to a level which is lower than the preset level and then returned to a level which is not lower than the preset level.

11. An apparatus according to claim 10, wherein said current limiting circuit includes a current limiting element for limiting a current supplied from said AC power source to said first rectifier circuit; and a short-circuiting circuit for short-circuiting said current limiting element.

12. An apparatus according to claim 11, wherein said current limiting element includes a resistor.

13. An apparatus according to claim 11, wherein said current limiting control circuit includes a circuit for making said short-circuiting circuit inoperative to make said current limiting element operative in a case where the detected voltage is lower than the preset level and making said short-circuiting circuit operative to make said current limiting element inoperative in a case where the detected voltage is not lower than the preset level.

14. An apparatus according to claim 11, wherein said current limiting control circuit includes a circuit for making said short-circuiting circuit inoperative to make said current limiting element operative for the second period of time after the detected voltage is returned to a level not lower than the preset level in a case where the detected voltage is first changed from a level which is not lower than the preset level to a level lower than the preset level and returned to the level which is not lower than the preset level and making said short-circuiting circuit operative to make said current limiting element inoperative after the second preset period of time has elapsed.

15. An apparatus according to claim 10, wherein said current limiting control circuit includes a level setting circuit for setting the preset level; and a voltage comparison circuit for comparing the detected voltage with the preset level set by said level setting circuit.

16. An apparatus according to claim 15, wherein said voltage detecting circuit includes at least two resistors for dividing a voltage rectified by said first rectifier circuit.

17. An apparatus according to claim 16, wherein said comparison circuit includes a comparator for comparing a detected voltage derived by voltage division with the preset level; and a feedback capacitor connected between an input terminal and output terminal of said comparator, for determining the time constant defining the second preset period together with part of said voltage dividing resistors.

18. An apparatus according to claim 10, wherein said first rectifier circuit includes a diode and a smoothing capacitor.

19. An apparatus according to claim 10, wherein said second rectifier circuit includes a diode and a smoothing capacitor.

* * * * *

UNITED STATES PATENT AND TRADEMARK OFFICE
CERTIFICATE OF CORRECTION

PATENT NO. : 5,570,277
DATED : October 29, 1996
INVENTOR(S) : Akihiko ITO, et al.

It is certified that error appears in the above-indentified patent and that said Letters Patent is hereby corrected as shown below:

Col. 4, line 27, change "AS" to --As--

Col. 9, line 4, change "$3" to --S3--

Signed and Sealed this

Eighteenth Day of March, 1997

Attest:

BRUCE LEHMAN

Attesting Officer

Commissioner of Patents and Trademarks